W. H. BOLES.
TOOL FOR DETACHING CARPET FASTENERS.
APPLICATION FILED AUG. 14, 1907.
939,207.
Patented Nov. 9, 1909.
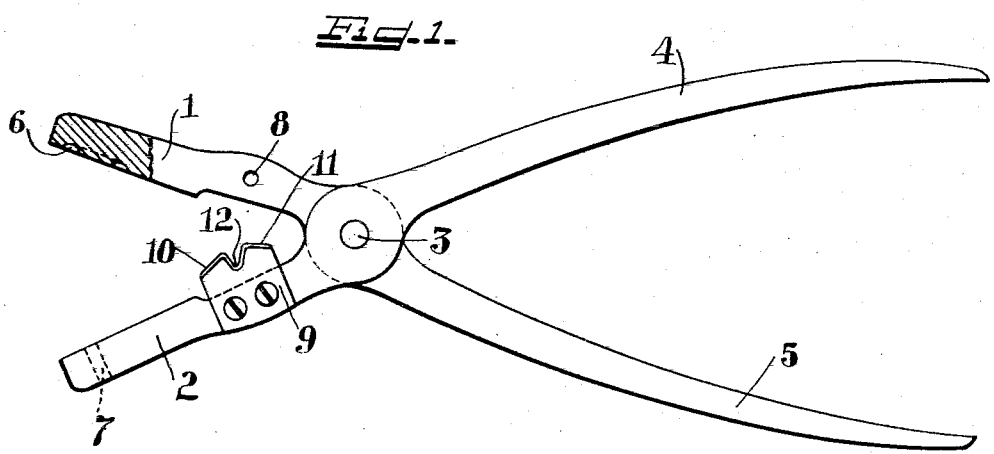
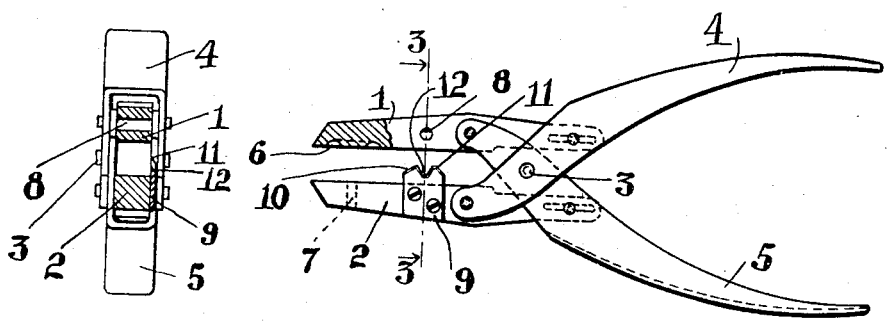
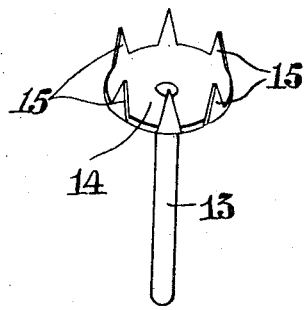
Attest:
Inventor:
Warren H Boles
by
Attys

UNITED STATES PATENT OFFICE.

WARREN H. BOLES, OF NEWARK, NEW JERSEY, ASSIGNOR TO BOLES FRICTION FASTENER COMPANY, OF NEWARK, NEW JERSEY, A CORPORATION OF NEW JERSEY.

TOOL FOR DETACHING CARPET-FASTENERS.

939,207.  Specification of Letters Patent.  Patented Nov. 9, 1909.

Application filed August 14, 1907. Serial No. 388,515.

*To all whom it may concern:*

Be it known that I, WARREN H. BOLES, a citizen of the United States, residing at Newark, in the county of Essex and State of New Jersey, have invented certain new and useful Improvements in Tools for Detaching Carpet-Fasteners and the Like; and I hereby declare the following to be a full, clear, and exact description of the same, such as will enable others skilled in the art to which it appertains to make and use the same.

My invention relates to improvements in tools or implements for detaching carpet fasteners and the like, and consists in the novel features hereinafter described and particularly pointed out in the claims.

The object of my invention is to provide a simple and relatively inexpensive tool for detaching carpet fasteners and the like, such as hereinafter described, which tool shall also be adapted to comprise means for attaching such fasteners.

I will now proceed to describe my invention with reference to the accompanying drawings, in which—

Figure 1 shows a side view of one form of my said clenching and cutting tool partly in section; Fig. 2 shows a side view of an alternative form of said tool; Fig. 3 shows a transverse section through the jaw of such tool on line 3—3 of Fig. 2; and Fig. 4 shows a detail perspective view of the fastener with which the said tool is particularly designed to be used.

The said fastener, or, more properly, fastening pin, consists of a shank 13 and head 14 having points or teeth 15 designed to be forced into a carpet or like fabric from beneath and then to be clenched over, so fastening such pin to the carpet or other fabric. The pin so attached is adapted to be received within a suitable socket, set in the floor or other convenient place. When, as is frequently necessary, such a fastener pin must be removed from the fabric to which it is attached, the most convenient and satisfactory method of removing it is to cut off the said teeth 15 close to the upper surface of the head 14; whereupon the said pin will of course drop away, and, if necessary, it is then easy to remove the teeth themselves from the fabric, although such loose teeth are not usually objectionable.
My implement for clenching and cutting off the teeth of such fastener pins, comprises a tool of the general nature of pliers, or "pincers" as they are sometimes termed, having jaws, and handles which when pressed together press said jaws together. These jaws are provided with means for holding the pin for the clenching and cutting operations and a clenching die and a suitable cutter. The implement shown in Fig. 1 comprises jaws 1 and 2 pivoted at 3 and provided respectively with handles 5 and 4. Jaw 1 is provided with a clenching die consisting of an annular groove 6; and jaw 2 has an aperture 7 adapted to receive the shank of a fastener pin as illustrated in Fig. 4 and hold the same in position such that the points 15 of such pin, when they contact with the clenching groove 6, will be bent over as required. Jaw 1 is further provided with an aperture 8 likewise adapted to receive the shank of the fastener pin, such aperture 8 being arranged to hold said pin in proper position with respect to a cutter 9 mounted on jaw 2. This cutter I customarily provide with three cutting edges 10, 11 and 12, of which cutting edge 12 is at the base of a notch, and cutting edges 10 and 11, are on opposite sides of said notch and incline backward therefrom. The inclination of all of these cutting edges causes them in operation to act upon the teeth of the fastener pins with a "drawing" action which materially facilitates the clean separation of the teeth from the head of the fastener pin.

This tool is used as follows: In attaching fastener pins such as shown in Fig. 4, along the edge of a carpet or other fabric, a pin is placed with its head between the jaws of the tool and its shank is in the aperture 7 of the jaw 2. The tool is then placed so that its jaws embrace the edge of the said carpet or other fabric at the desired point, the said fastener pin 13 being on that side of the fabric to which said pin is to be attached (usually the under side). The handles 4 and 5 are then pressed together thereby forcing together the jaws 1 and 2, and pressing the teeth 15 of the fastener pin up through the fabric into the clenching groove 6, which groove thereupon turns the said teeth 15 so as to clench them into the fabric. In detaching fasteners so clenched from a fabric, the shank of the fastener pin is inserted through recess 8, the knife 9 being toward the head of such pin, and the tool is pressed toward the head until said head rests against jaw 1. The handles 4 and 5 are then pressed together, whereupon the knife 9 will cut off some of the teeth 15; and by separating the handles again, turning them around, and again pressing them together, more, and usually all the remaining, teeth, may be cut off.

In practice fasteners such as shown in Fig. 4 are provided either with four or with six teeth; and if provided with six teeth, three of said teeth may be cut off at one closing of the jaws 1 and 2, one tooth entering the notch in cutter 9 and being cut off by the cutting edge in the lower end thereof, the two adjacent teeth being cut off by the edges 10 and 11 respectively. If the fastener has only four teeth it will usually be found better to cause the edges 10 and 11 only to act, so cutting off two teeth at a time.

The implement shown in Fig. 2 is the same in general principle as that shown in Fig. 1, but its jaw mechanism is that of the well known parallel-jaw plier and cutters, said jaws approaching and receding, according as the handles are operated, without losing the substantial parallelism illustrated. This jaw mechanism is well known and does not require detail illustration and description.

It will be noted that in both forms of the tool shown in the drawings, the clenching die 6 and the corresponding holding aperture 7 are each near the outer end of its respective jaw, the cutter 9 and its corresponding holding aperture 8 being inside, or toward the handles, with respect to the clenching means. Thereby interference of the cutting device with the operation of the clenching device is avoided; for if the said cutting and clenching devices were arranged reversely, the cutting knife would interfere with the insertion of the rug, carpet or the like between the jaws far enough to bring it within the range of action of the clenching device.

What I claim is:—

1. A tool for attaching and detaching carpet fasteners, comprising jaws and means for moving them toward and from each other, one of said jaws being provided with a hole for holding the shank of a fastener pin provided with upward-projecting teeth, the other of said jaws being provided with a cutter having a recess with cutting edges extending laterally therefrom.

2. A tool for attaching and detaching carpet fasteners, comprising jaws and means for moving them toward and from each other, one of said jaws being provided with a hole for holding the shank of a fastener pin provided with upward-projecting teeth, the other of said jaws being provided with a cutter having a recess with a cutting edge therein, and having outside of said recess other cutting edges.

3. A tool for attaching and detaching carpet fasteners, comprising jaws and means for moving them toward and from each other, one of said jaws being provided with a hole for holding the shank of a fastener pin provided with upward-projecting teeth, the other of said jaws being provided with a cutter having a recess with a cutting edge therein, and having adjacent said recess bevel cutting edges.

In testimony whereof I affix my signature, in the presence of two witnesses.

WARREN H. BOLES.

Witnesses:
H. M. MARBLE,
K. G. LE ARD.